US011566694B2

United States Patent
Yasuda et al.

(10) Patent No.: US 11,566,694 B2
(45) Date of Patent: Jan. 31, 2023

(54) MULTIPLE-PURPOSE VEHICLE

(71) Applicant: Kubota Corporation, Osaka (JP)

(72) Inventors: Toshifumi Yasuda, Sakai (JP); Yusuke Morita, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 17/708,774

(22) Filed: Mar. 30, 2022

(65) Prior Publication Data

US 2022/0221036 A1  Jul. 14, 2022

Related U.S. Application Data

(63) Continuation of application No. 17/319,537, filed on May 13, 2021, now Pat. No. 11,320,029.

(30) Foreign Application Priority Data

Oct. 5, 2020  (JP) .............................. JP2020-168722

(51) Int. Cl.
  *F16H 61/70* (2006.01)
  *F16H 37/02* (2006.01)

(52) U.S. Cl.
  CPC .......... *F16H 37/021* (2013.01); *F16H 61/70* (2013.01); *F16H 2200/0039* (2013.01)

(58) Field of Classification Search
  CPC .. F16H 61/70; F16H 2200/0039; F16H 3/085; F16H 3/091; F16H 3/093; B60K 17/06; B60K 17/34; B60K 17/08
  See application file for complete search history.

(56) References Cited

U.S. PATENT DOCUMENTS

| 6,450,052 | B1 | 9/2002 | Luh |
| 6,725,962 | B1 | 4/2004 | Fukuda |
| 7,089,824 | B2 * | 8/2006 | Nakatani .............. B60K 17/105 74/606 R |
| 8,007,403 | B2 | 8/2011 | Ishida et al. |
| 8,181,731 | B2 * | 5/2012 | Bessho .................. B60K 17/10 180/305 |
| 9,475,384 | B2 * | 10/2016 | Matsuura ............. B60K 17/105 |
| 2007/0017729 | A1 * | 1/2007 | Nishimoto ............. B60K 17/28 180/374 |
| 2007/0219047 | A1 | 9/2007 | Nakatani et al. |
| 2015/0306954 | A1 * | 10/2015 | Matsuura ............. B60K 17/105 180/233 |
| 2020/0325987 | A1 | 10/2020 | Nishitomo et al. |

FOREIGN PATENT DOCUMENTS

| JP | 10324169 A |   | 12/1998 |
| JP | 2000272359 A | * | 10/2000 |
| JP | 200967082 A |   | 4/2009 |

* cited by examiner

*Primary Examiner* — Sherry L Estremsky
(74) *Attorney, Agent, or Firm* — The Webb Law Firm

(57) ABSTRACT

A gear transmission (20) includes a plurality of shift gears (36, 37), a plurality of shifters (55, 56) engaged, respectively, with the plurality of shift gears (36, 37), and a shift drum (58) rotatably operated by a stepped speed changing operational tool (66) to operate the plurality of shifters (55, 56), thus being speed-changed in forward three speed stages. The stepped speed changing operational tool (66) is switched to a neutral position, a forward third speed position, a forward second speed position and a forward first speed position in this cited order.

7 Claims, 7 Drawing Sheets

MULTIPLE-PURPOSE VEHICLE

CROSS-REFERENCE TO RELATED APPLICATION

This application is a continuation of U.S. patent application Ser. No. 17/319,537, filed May 13, 2021, which claims priority to Japanese Patent Application No. 2020-168722 filed Oct. 5, 2020, the disclosure of which is hereby incorporated by reference in its entirety.

BACKGROUND OF THE INVENTION

1. Field of the Invention

The present invention relates to a multiple-purpose vehicle.

2. Description of Related Art

A known multiple-purpose vehicle includes a stepless speed changing device and a gear transmission provided in series in a traveling transmission system for transmitting power from an engine to a traveling device and configured to speed-change the power from the engine and transmit the resultant power to the traveling device. The known vehicle further includes a stepless speed changing operational tool for speed-changing operation of the stepless speed changing device and a stepped speed changing operational tool for speed-changing operation of the gear transmission, the stepless speed changing operational tool and the stepped speed changing operational tool being provided separately.

In this type of multiple-purpose vehicle, the gear transmission includes a plurality of shift gears, a plurality of shifters engaged respectively with the plurality of shift gears, a shift drum having, it is outer circumference portion, a plurality of shifter operational cam portions to which the plurality of shifters are engaged respectively and operably coupled to the stepped speed changing operational tool, the gear transmission being configured such that the shift gears are engaged/disengaged with/from speed changing gears for setting speeds as the plurality of shifters are operated by the shifter operational cam portions.

An example of a multiple-purpose vehicle of this type is known from e.g. Patent Document 1. The multiple-purpose vehicle disclosed in Patent Document 1 includes a hydrostatic stepless speed changing device as a stepless speed changing device speed-changed by a speed changing pedal as the stepless speed changing operational tool and includes also a transmission speed-changed by a speed changing lever as the stepped speed changing operational tool. The transmission includes a first shifter and a second shifter as "shift gears", a first shift fork as a "shifter" engaged with the first shifter and a second shift fork as a "shifter" engaged with the second shifter, and a cam shaft as a "shift drum" having in its outer circumference portion a first guide groove as a "shifter operational cam portion" engageable with the first shift fork and a second guide groove as a "shifter operational cam portion" engageable with the second shift fork.

Patent Document 1: Japanese Unexamined Patent Application No. 2009-67082 document.

SUMMARY OF THE INVENTION

In this type of multiple-purpose vehicle, main speed changing operations of the traveling speed are effected by the stepless speed changing device and auxiliary speed changing operations of the traveling speed are effected by the gear transmission. If the number of speeds for utility works that can be provided by the auxiliary speed changing operations is small, the number of kinds of utility work that can be carried out with using the multiple-purpose vehicle is limited disadvantageously. Thus, there is a need for ability to provide a plurality of speed stages by auxiliary speed changing operations for utility works.

The present invention provides a multiple-purpose vehicle that can provide a plurality of speed stages by auxiliary speed changing operations for utility works and that also can be used conveniently.

A multiple-purpose vehicle according to one embodiment of the present invention comprises:

a stepless speed changing device and a gear transmission provided in series in a traveling transmission system for transmitting power from an engine to a traveling device and configured to speed-change the power from the engine and transmit the resultant power to the traveling device;

a stepless speed changing operational tool for speed-changing operation of the stepless speed changing device; and a stepped speed changing operational tool provided separately of the stepless speed changing operational tool and provided for speed-changing operation of the gear transmission;

wherein the gear transmission includes a plurality of shift gears, a plurality of shifters engaged respectively with the plurality of shift gears, a shift drum having, it is outer circumference portion, a plurality of shifter operational cam portions to which the plurality of shifters are engaged respectively and operably coupled to the stepped speed changing operational tool;

wherein the gear transmission is configured such that the shift gears are engaged/disengaged with/from speed changing gears for setting speeds as the plurality of shifters are operated by the shifter operational cam portions in association with a rotational operation of the shift drum by the stepped speed changing operational tool and further configured to speed-change power inputted thereto to forward traveling power in forward three speed stages; and wherein the stepped speed changing operational tool is configured to be capable of switching to a neutral position, a forward third speed position corresponding to a forward third speed, a forward second speed position corresponding to a forward second speed lower than the forward third speed and a forward first speed position corresponding to a forward first speed lower than the forward second speed in this cited order.

With the above-described inventive arrangement, the gear transmission can be speed-changed in forward three speed stages, so even if speed stage for realizing forward third speed is set for moving (traveling), it is still possible to set (assign) the two speed stages of the forward first speed and the forward second speed for a utility work, thus, auxiliary speed changing operations for a utility work can be effected in two speed stages.

With a multiple-purpose vehicle, traveling thereof effected by auxiliary speed changing operation to a high speed is effected more frequently than traveling with auxiliary speed changing to a low speed. For this reason, the stepped speed changing operational tool is switched from the neutral position to the forward third speed more frequently than being switched from the neutral position to the forward first speed or to the forward second speed. Therefore, it is convenient that switchover to the forward third speed position can be effected more speedily than switchover to the forward first speed position or to the forward second speed position from the neutral position.

In the present invention, preferably:

the speed changing gears include a third speed gear for setting the forward third speed, a second speed gear having an outside diameter greater than an outside diameter of the third speed gear for setting the forward second speed, and a first speed gear having an outside diameter greater than the outside diameter of the second speed gear for setting the forward first speed;

the third speed gear, the second speed gear and the first speed gear are supported to a rotation support shaft extending in a lateral width direction of the gear transmission; and the first speed gear is supported to the rotation support shaft between the second speed gear and the third speed gear.

In general, an intra-case space at the center portion of the transmission case lateral width direction can be formed large more easily than an intra-case space in the transmission case lateral side portion. In the above arrangement, since the first speed gear having an outside diameter greater than the outside diameters of the third speed gear and the second speed gear is disposed at the center portion of the intra-case space that can be readily formed large, the first speed gear, the second speed gear and the third speed gear can be readily assembled inside the transmission case.

Further, preferably, in the lateral width direction of the gear transmission, the first speed gear is disposed on more inner side of the machine body than the second speed gear and more inner side of the machine body than the third speed gear.

DETAILED DESCRIPTION OF PREFERRED EMBODIMENTS

Next, an embodiment as an example of the present invention will be explained with reference to the accompanying drawings.

Figure 1:
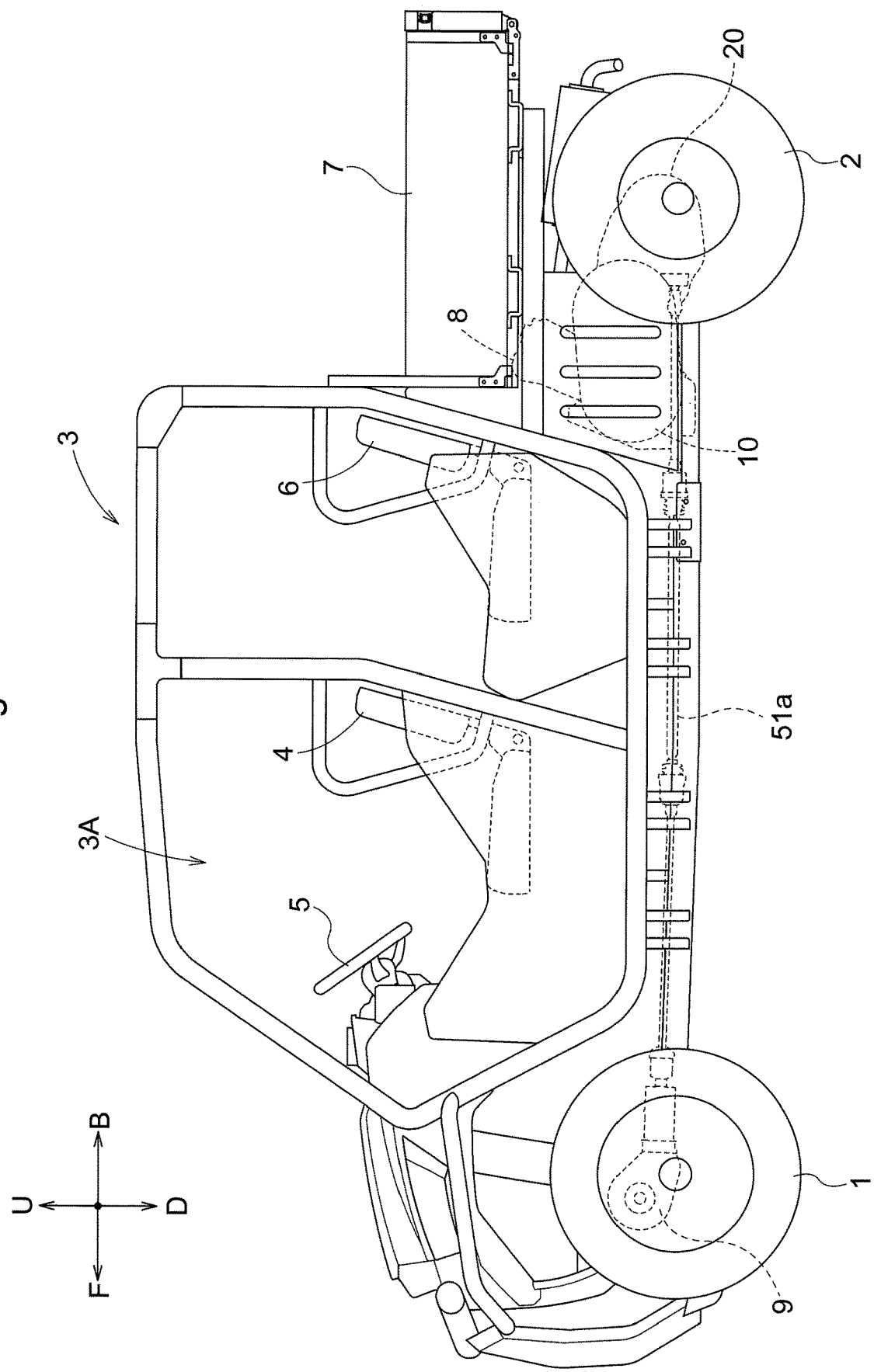
FIG. 1 is a left side view showing a multiple-purpose vehicle in its entirety.

Incidentally, in the following explanation, with respect to a traveling vehicle body of a multiple-purpose vehicle, the direction of arrow F shown in FIG. 1 is defined as "vehicle body front side", the direction of arrow B shown therein is defined as "vehicle body rear side", the direction of arrow U shown therein is defined as "vehicle body upper side", the direction of arrow D shown therein is defined as "vehicle body lower side", the direction on the near (front) side of the plane of illustration is defined as "vehicle body left side", and the direction on the far (back) side of the plane of illustration is defined as "vehicle body right side", respectively.

[General Arrangement of Multiple-Purpose Vehicle]

As shown in FIG. 1, the multiple-purpose vehicle includes a traveling vehicle body having a pair of steerable and drivable left and right front wheels 1 as "traveling devices" and a pair of drivable left and right rear wheels 2 as further "traveling devices". At a front/rear intermediate portion of the traveling vehicle body, a riding section 3 is formed. In this riding section 3, there are provided a driver's seat 4, a driving section 3A including a steering wheel 5 for steering the front wheels 1, and a rear seat 6 disposed on more rear side than the driver's seat 4. At a rear portion of the traveling vehicle body, a load-carrying deck 7 is provided. Beneath the load-carrying deck 7, there is provided an engine 8 outputting power to the front wheels 1 and the rear wheels 2.

[Traveling Power Transmission System]

Figure 2:
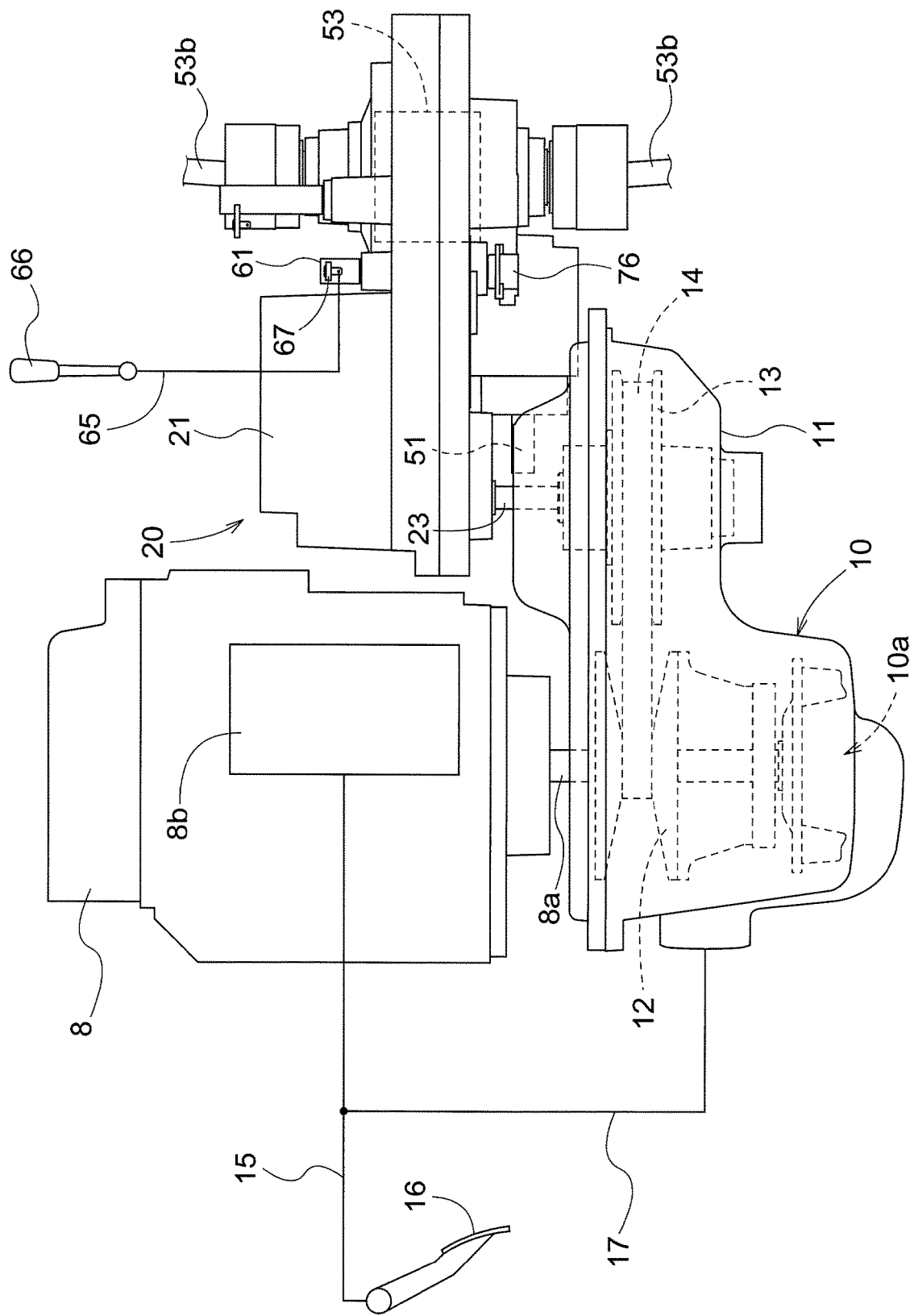
FIG. 2 is a plan view showing a traveling power transmission system.

FIG. 2 is a plan view showing a traveling power transmission system configured to transmit power from the engine 8 to the front wheels 1 (see FIG. 1) and the rear wheels 2 (see FIG. 1). This traveling power transmission system includes a stepless speed changing device 10 and a gear transmission 20 configured to speed-change power from the engine 8 and to output the resultant power to the front wheels 1 and the rear wheels 2. The gear transmission 20 is provided rearwardly of the engine 8. The stepless speed changing device 10 and the gear transmission 20 are arranged in series with each other so that the output of the stepless speed changing device 10 is inputted to the gear transmission 20. In this embodiment, power of an output shaft 8a of the engine 8 is inputted to the stepless speed changing device 10 and the power speed-changed by the stepless speed changing device 10 is inputted to the gear transmission 20 and the power speed-changed by the gear transmission 20 is outputted from a front wheel output shaft 51 which protrudes forwardly from a lower portion of a transmission case 21 to the front wheels 1. The power speed-changed by the gear transmission 20 is transmitted from a rear wheel differential mechanism 53 provided within a rear portion of the transmission case 21 to the rear wheels 2 via left and right rear wheel driving shafts 53b. The front wheel output shaft 51 is coupled to a front wheel differential mechanism (not shown) provided inside a front wheel driving case 9 (see FIG. 1) via a rotational shaft 51a (see FIG. 1).

[Stepless Speed Changing Device]

As shown in FIG. 2, the stepless speed changing device 10 is provided between a lateral side of the engine 8 and a lateral side of the gear transmission 20. This stepless speed changing device 10 includes a speed changing case 11. Inside this speed changing case 11, there are provided an input pulley 12 operably coupled to the output shaft 8a of the engine 8, an output pulley 13 operably coupled to an input shaft (first shaft 23) of the gear transmission 20, and an endless rotation belt 14 wound around the input pulley 12 and the output pulley 13. The input pulley 12 and the output pulley 13 are constituted of split pulleys to allow changing of a winding diameter of the endless rotation belt 14. The stepless speed changing device 10 is constituted as a so-called belt type stepless speed changing device.

As shown in FIG. 2, an accelerator pedal 16 coupled via an accelerator coupling mechanism 15 to an accelerator device 8b of the engine 8 and a speed changing operation section 10a provided in the stepless speed changing device 10 are coupled to each other via a stepless speed changing coupling mechanism 17. The accelerator pedal 16 is provided in the driving section 3A. When the accelerator device 8b is operated by the accelerator pedal 16 to adjust the engine rotation speed to the rising side, due to the action of the stepless speed changing coupling mechanism 17, the speed changing operation section 10a is operated in operative association with the action of the accelerator device 8b, the stepless speed changing device 10 is speed-changed toward the high speed side. When the accelerator device 8b is operated by the accelerator pedal 16 to adjust the engine rotation speed to the falling side, due to the action of the stepless speed changing coupling mechanism 17, the speed changing operation section 10a is operated in operative association with the action of the accelerator device 8b, the stepless speed changing device 10 is speed-changed toward the low speed side.

The stepless speed changing device 10 is configured to be speed-changed as a main speed changing device for changing driving speeds of the front wheels 1 and the rear wheels 2. Speed changing operations of the stepless speed changing device 10 are effected by the accelerator pedal 16 acting as a "stepless speed changing operational tool". Specifically, when the accelerator pedal 16 is operated, the belt winding diameters of the input pulley 12 and the output pulley 13 are changed, and the power inputted from the engine 8 to the input pulley 12 is speed-changed steplessly between the input pulley 12 and the output pulley 13 and outputted as such from the output pulley 13 to the gear transmission 20.

[Gear Transmission]

Figure 4:
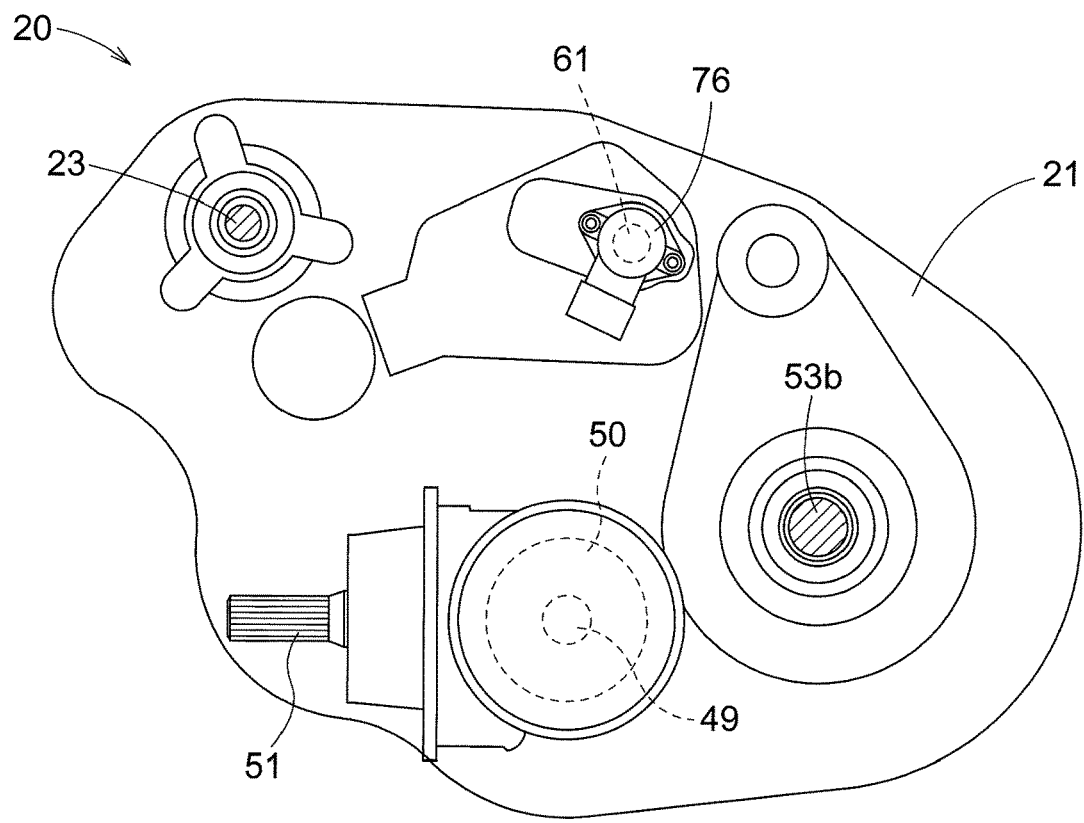
FIG. 4 is a left side view showing a gear transmission.
Figure 5:
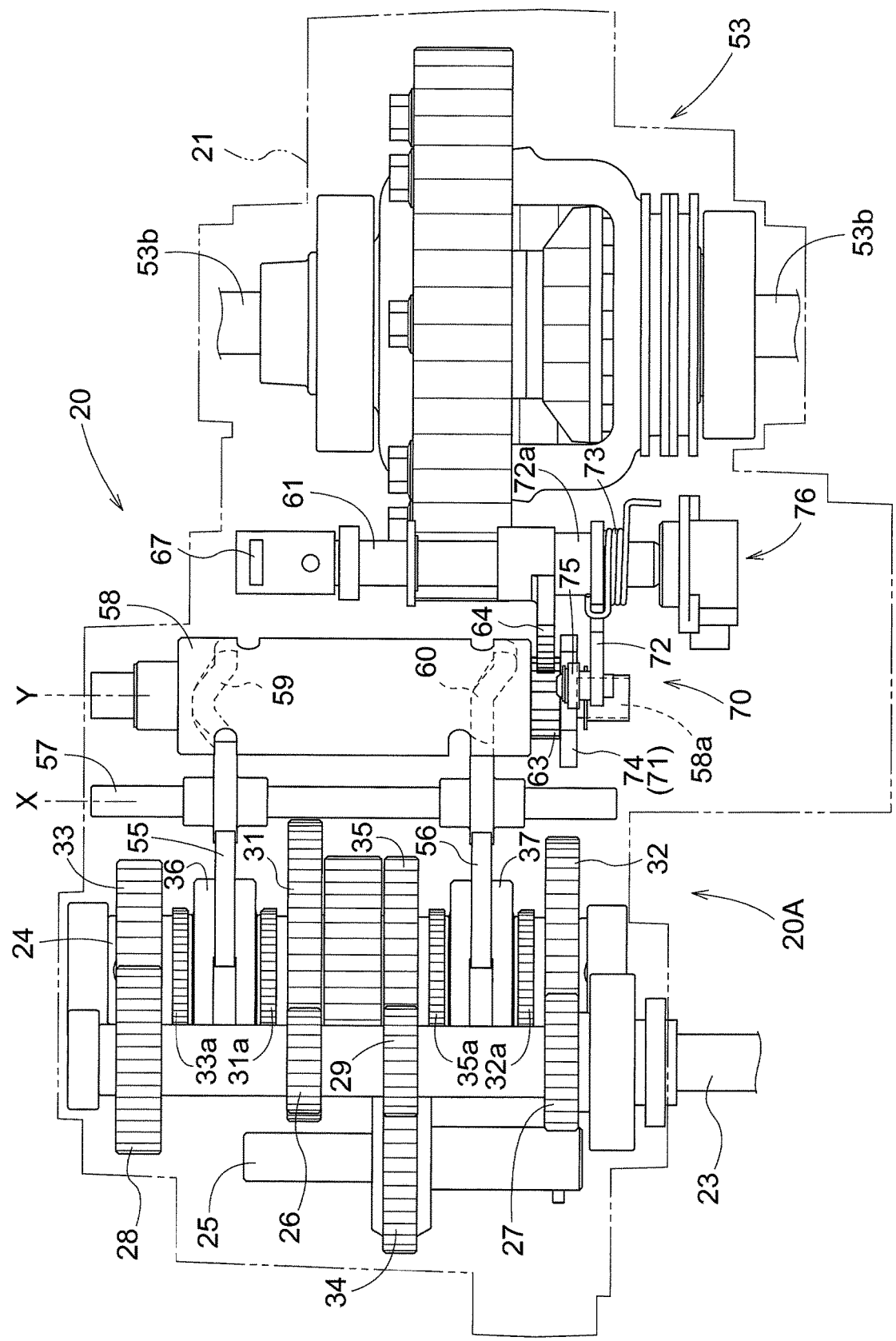
FIG. 5 is a plan view showing the gear transmission.
Figure 6:
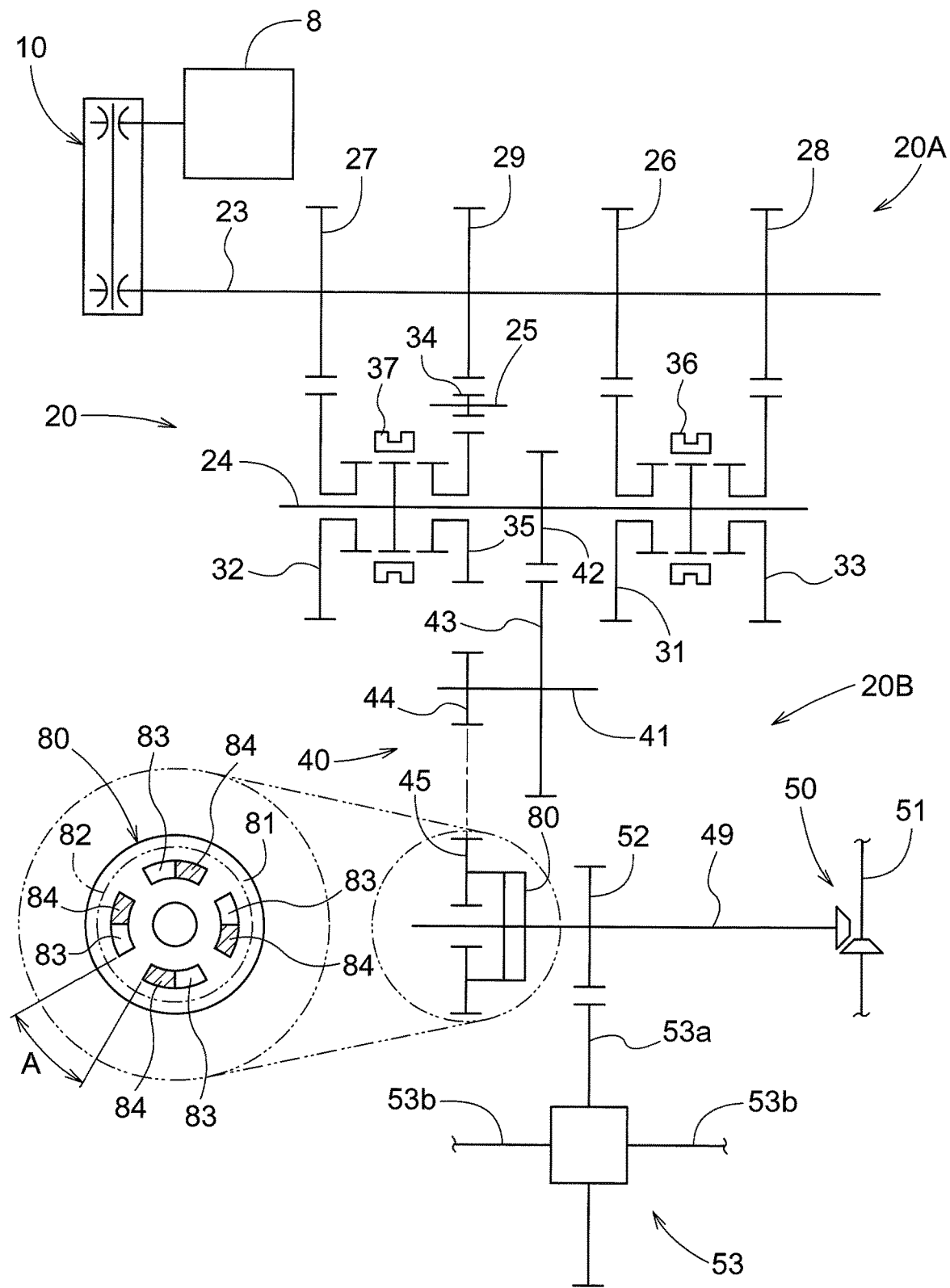
FIG. 6 is a diagram showing the gear transmission.

The gear transmission 20, as shown in FIG. 2, includes the transmission case 21 and is arranged in such a manner that the lateral width direction of the transmission case 21 is aligned with the lateral width direction of the traveling vehicle body. As shown in FIG. 4, FIG. 5 and FIG. 6, the gear transmission 20 includes a speed changing section 20A having a first shaft 23 rotatably supported to a front upper portion of the transmission case 21, etc. and a transmission mechanism 20B configured to output power of the speed changing section 20A to the front wheels 1 and the rear wheels 2.

The speed changing section 20A, as shown in FIGS. 5 and 6, includes, in addition to the first shaft 23, a second shaft 24 and a third shaft 25 which are provided inside the transmission case 21 and arranged side by side in parallel with the first shaft 23. The first shaft 23, the second shaft 24 and the third shaft 25 are provided to extend along the lateral width direction of the transmission case 21.

One end side of the first shaft 23 protrudes from the transmission case 21 toward the stepless speed changing device 10 and is coupled to the output pulley 13 of the stepless speed changing device 10. The first shaft 23 acts as an input shaft of the gear transmission 20. As shown in FIGS. 5 and 6, inside the transmission case 21, the first shaft 23 mounts thereon a first input gear 26, a second input gear 27, a third input gear 28, and a fourth input gear 29.

As shown in FIGS. 5 and 6, a second shaft 24, as a "rotation support shaft", rotatably mounts thereon a first speed (speed changing) gear 31 meshed with the first input gear 26 for setting a forward first speed, a second speed (speed changing) gear 32 meshed with the second input gear 27 for setting a forward second speed, and a third speed (speed changing) gear 33 meshed with the third input gear 28 for setting a forward third speed. A reverse-rotation gear 34 meshed with the fourth input gear 29 is mounted on a third shaft 25, and a reverse traveling gear 35 meshed with the reverse-rotation gear 34 for setting reverse first speed is rotatably mounted on the second shaft 24.

Figure 7:
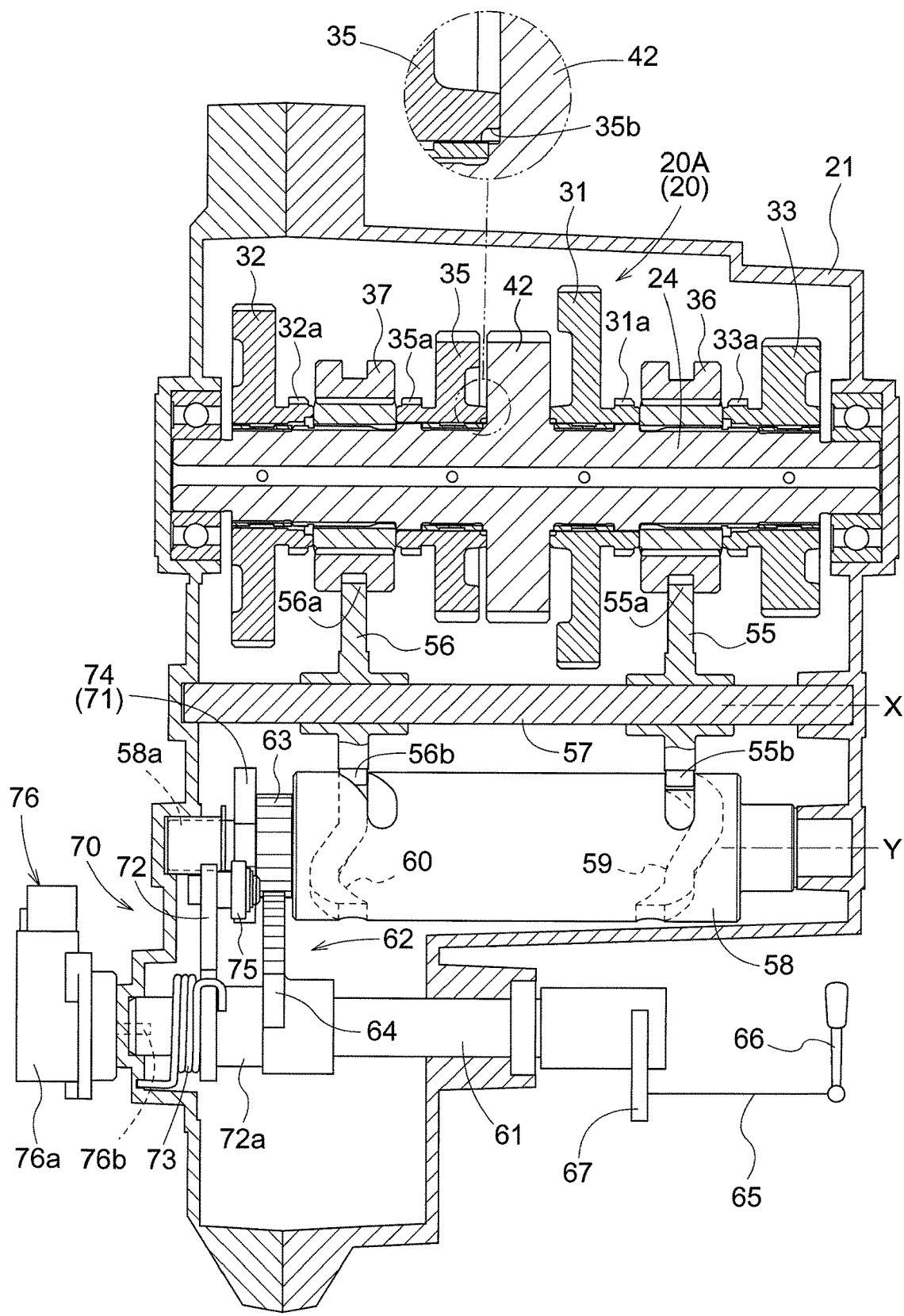
FIG. 7 is a section view showing a speed changing section of the gear transmission.

As shown in FIG. 7, the outside diameter of the first speed gear 31 is set larger than the outside diameter of the third speed gear 33. The outside diameter of the first speed gear 31 is set also larger than the outside diameter of the second speed gear 32. The outside diameter of the second speed gear 32 is set larger than the outside diameter of the third speed gear 33. The first speed gear 31 whose outside diameter is larger than the outside diameter of the second speed gear 32 and the outside diameter of the third speed gear 33 is located on more inner side than the second speed gear 32 and located also on more inner side than the third speed gear 33, in the lateral width direction of the transmission case 21.

As shown in FIG. 7, between the first speed gear 31 and the third speed gear 33, a first shift gear 36 is supported to the second shaft 24. The first shift gear 36 is supported on the second shaft 24 to be slidable to a transmission state in which the first shift gear 36 is meshed with a teeth portion 31a formed at a lateral portion of the first speed gear 31 to operably couple the first speed gear 31 to the second shaft 24, a transmission state in which the first shift gear 36 is meshed with a teeth portion 33a formed at a lateral portion of the third speed gear 33 to operably couple the third speed gear 33 to the second shaft 24, and a neutral state in which the first shift gear 36 is removed from the teeth portion 31a of the first speed gear 31 to release the operable coupling of the first speed gear 31 relative to the second shaft 24 and also removed from the teeth portion 33a of the third speed gear 33 to release the operable coupling of the third speed gear 33 relative to the second shaft 24.

As shown in FIG. 7, between the second speed gear 32 and the reverse traveling gear 35, a second shift gear 37 is supported to the second shaft 24. The second shift gear 37 is supported on the second shaft 24 to be slidable to a transmission state in which the second shift gear 37 is meshed with a teeth portion 32a formed at a lateral portion of the second speed gear 32 to operably couple the second speed gear 32 to the second shaft 24, a transmission state in which the second shift gear 37 is meshed with a teeth portion 35a formed at a lateral portion of the reverse traveling gear 35 to operably couple the reverse traveling gear 35 to the second shaft 24, and a neutral state in which the second shift gear 37 is removed from the teeth portion 32a of the second speed gear 32 to release the operable coupling of the second speed gear 32 relative to the second shaft 24 and also removed from the teeth portion 35a of the reverse traveling gear 35 to release the operable coupling of the reverse traveling gear 35 relative to the second shaft 24.

As shown in FIG. 6, the transmission mechanism 20B includes a fifth shaft 49 as a "rotation transmission shaft" having one end portion thereof operably coupled to the second shaft 24 via a gear coupling mechanism 40 having a fourth shaft 41, etc., a front wheel output shaft 51 operably coupled to the other end of the fifth shaft 49 via a bevel gear mechanism 50 for outputting power of the fifth shaft 49 to the front wheel 1, and a rear wheel differential mechanism 53 having an input gear 53a thereof operably coupled to an intermediate portion of the fifth shaft 49 for outputting power of the fifth shaft 49 to the rear wheel 2. The input gear 53a is engaged with a transmission gear 52 provided on the fifth shaft 49, thus being operably coupled to this fifth shaft 49. The front wheel output shaft 51 is provided to extend in the front/rear direction of the transmission case 21. The fourth shaft 41 and the fifth shaft 49 are provided to extend along the lateral width direction of the transmission case 21.

The gear coupling mechanism 40, as shown in FIG. 6, includes, in addition to the fourth shaft 41, a first transmission gear 42 mounted on the second shaft 24, a second transmission gear 43 mounted at one end portion of the fourth shaft 41 and meshed with the first transmission gear 42, a third transmission gear 44 provided at the other end portion of the fourth shaft 41, and a fourth transmission gear 45 meshed with the third transmission gear 44 and provided at one end portion of the fifth shaft 49.

As shown in FIG. 7, at an angular portion opposed to the first transmission gear 42 at the root portion of the reverse traveling gear 35, there is formed a stepped portion 35*b* for mitigating stress concentration. At an angular portion opposed to the first transmission gear 42 at the root portion of the first speed gear 31, there is formed a stepped portion similar to the stepped portion 35*b* of the reverse traveling gear 35.

As shown in FIGS. 5 and 7, a first shifter 55 having a leading end portion 55*a* thereof engaged with the first shift gear 36 and a second shifter 56 having a leading end portion 56*a* thereof engaged with the second shift gear 37 are slidably supported on a shifter support shaft 57. This shifter support shaft 57 is supported to the transmission case 21 in parallel juxtaposition with the second shaft 24. A shift drum 58 having a drum axis Y parallel with a support axis X of the shift support shaft 57 is rotatably supported to the transmission case 21. In the outer circumferential portion of the shift drum 58, there are provided a first shifter operating cam portion 59 to which an operation portion 55*b* of the first shifter 55 is engaged and a second shifter operating cam portion 60 to which an operation portion 56*b* of the second shifter 56 is engaged. The first shifter operating cam portion 59 and the second shifter operating cam portion 60 are constituted of guide grooves into which the operation portions 55*b*, 56*b* respectively come into slidable engagement. As the shift drum 58 is rotated about the drum axis Y, the first shifter 55 is slid along the shifter support shaft 57 by the first shifter operating cam portion 59 to slide the first shift gear 36 and the second shifter 56 is slid along the shifter support shaft 57 by the second shifter operating cam portion 60 to slide the second shift gear 37.

There is provided a speed changing operation shaft 61 for rotating the shift drum 58. Specifically, the speed changing operation shaft 61, as shown in FIGS. 5 and 7, extends along the lateral width direction of the transmission case 21 and is rotatably supported to an upper portion of the transmission case 21 in parallel juxtaposition with the drum axis Y. As shown in FIG. 7, inside the transmission case 21, between one end portion of the speed changing operation shaft 61 and a supporting shaft portion 58*a* of the shift drum 58, there is provided a coupling mechanism 62 for operably coupling the speed changing operation shaft 61 with the shift drum 58. When the speed changing operation shaft 61 is rotatably operated, power of the speed changing operation shaft 61 is transmitted by the coupling mechanism 62 to the supporting shaft portion 58*a*, whereby the shift drum 58 is rotatably operated.

Figure 8:
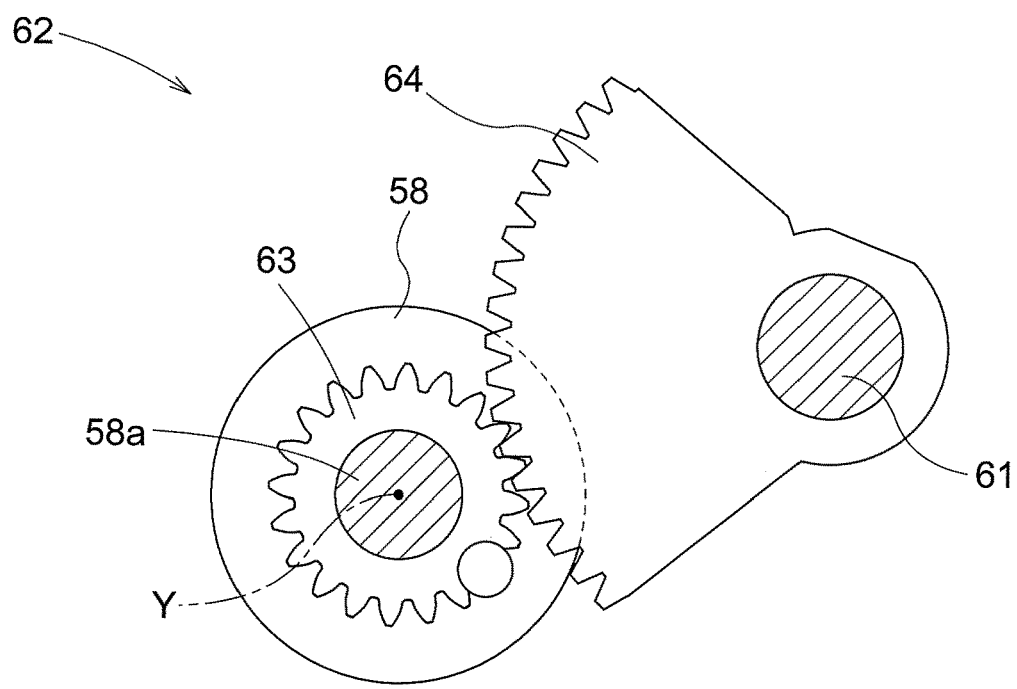
FIG. 8 is a side view showing a coupling mechanism.

The coupling mechanism 62, as shown in FIGS. 7 and 8, includes a drum operating gear 63 provided on the support shaft portion 58*a* of the shift drum 58 and rotatable with the shift drum 58 and a transmission gear 64 provided at one end portion of the speed changing operation shaft 61 as being meshed with the drum operating gear 63 and rotatable with the speed changing operation shaft 61. The transmission gear 64 is constituted of a fan-shaped gear.

As shown in FIGS. 2 and 7, a stepped speed changing operational tool 66 is coupled via the coupling mechanism 65 to the speed changing operation shaft 61. The stepped speed changing operational tool 66 is provided at the driving section 3A. The coupling mechanism 65 includes a pivot arm 67 extended from the end portion of the speed changing operation shaft 61 opposite to the side where the coupling mechanism 66 is provided, an operation cable for coupling the pivot arm 67 to the stepped speed changing operational tool 66, etc.

[Detent Mechanism]

A detent mechanism 70 is provided for fixing the shift drum 58 at a rotation operation position where the first shift gear 36 and the second shift gear 37 are engaged with each other or under the neutral state. The detent mechanism 70 is provided inside the transmission case 21.

Figure 9:
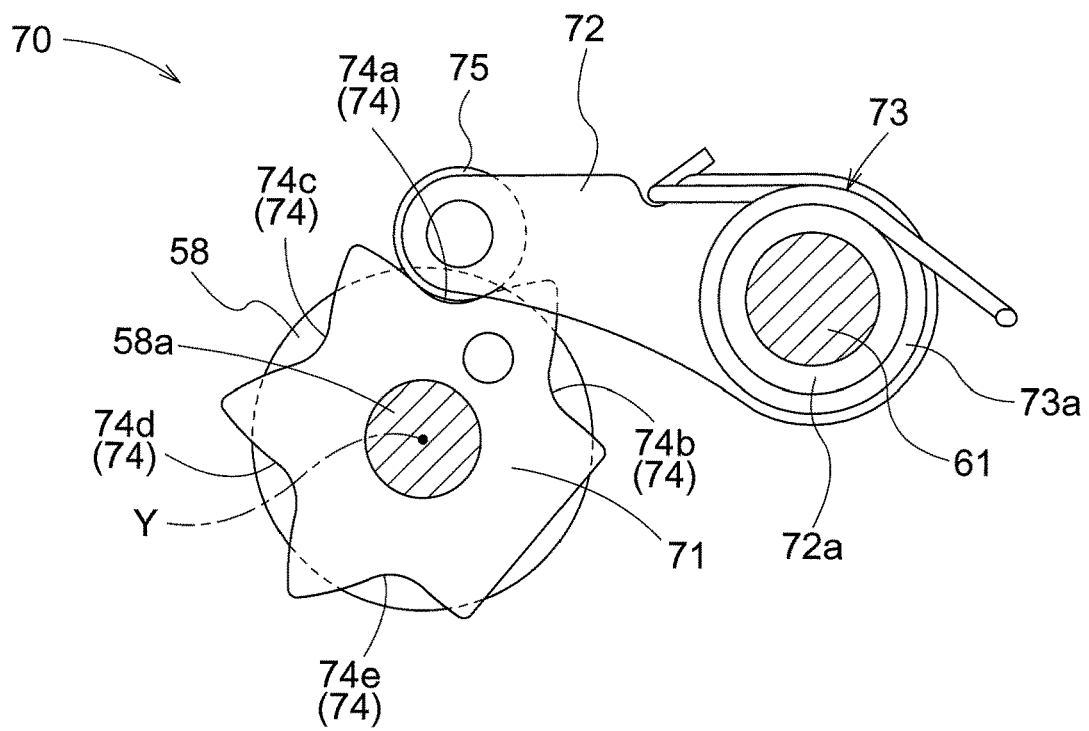
FIG. 9 is a side view showing a detent mechanism.

Specifically, the detent mechanism 70, as shown in FIGS. 7 and 9, includes a positioning rotation portion 71 formed at the support shaft portion 58*a* of the shift drum 58, a positioning arm 72 extended from the speed changing operation shaft 61 toward the positioning rotation portion 71 and a positioning spring 73 having a coil portion 73*a* thereof engaged on a boss portion 72*a* of the positioning arm 72.

At five positions in the circumference portion of the positioning rotation portion 71, there are provided receded portions 74 as "positioning action portions". The positioning arm 72 is rotatably supported, at a boss portion 72*a* provided at the base portion thereof, on the speed changing operation shaft 61. At the free end portion of the positioning arm 72, a roller 75 is rotatably provided. In operation, as the positioning arm 72 is pivoted about the speed changing operation shaft 61 in association with rotation of the positioning rotation shaft 71, the positioning arm 72 will be engaged/disengaged with/from the receded portion 74 by the roller 75 and with this engagement in the receded portion 74, the positioning rotation portion 71 is fixed in a rotational position corresponding to the rotation operation position of the shift drum 58. One end portion of the positioning spring 73 is retained to the positioning arm 72 and the other end portion of the positioning spring 73 is retained to the transmission case 21. The positioning arm 72 is pivotally urged by the positioning spring 73 to be engaged in the receded portion 74.

[Rotation Potentiometer]

A rotation potentiometer 76 is provided for detecting an operation position (operated position) of the speed changing operation shaft 61. This rotation potentiometer 76, as shown in FIGS. 4 and 7, is provided outside the transmission case 21. A meter case 76*a* of the rotation potentiometer 76 is screw-fixed to the transmission case 21. A rotation operation shaft 76*b* of the rotation potentiometer 76 is disposed such that the axis of this rotation operation shaft 76*b* is positioned on the axis of the speed changing operation shaft 61. The rotation operation shaft 76*b* and the speed changing operation shaft 61 are engaged with each other to be rotatable in unison. More particularly, the rotation operation shaft 76*b* and the speed changing operation shaft 61 are engaged with each other to be rotatable in unison, with engagement of the rotation operation shaft 76*b* in a coupling hole provided in the speed changing operation shaft 61. The engagement between the rotation operation shaft 76*b* and the speed changing operation shaft 61 is realized by the rotation operation shaft 76*b* and a non-circular shape of the coupling hole.

The gear transmission 20 is configured to be speed-changed as an auxiliary speed changing device which changes the driving speeds of the front wheels 1 and the rear wheels 2 in a reverse traveling one speed, and forward traveling three speeds, in total four speeds. Speed changing operations of the gear transmission 20 are effected by the stepped speed changing operational tool 66.

Figure 3:
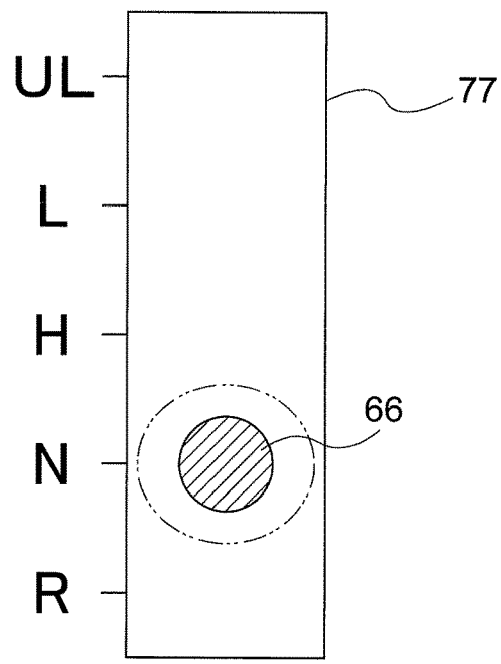
FIG. 3 is an explanatory view showing operational positions of a stepped speed changing operational tool.

More particularly, as shown in FIG. 3, the stepped speed changing operational tool 66, in association with pivotal operations thereof, is guided by an operational tool guide 77 to be switched over to a neutral position [N], a reverse (reverse traveling) position [R], a forward first speed position [UL], a forward second speed position [L] and a forward third speed position [H].

The forward second speed position [L] is an operation position of a lower speed than the forward third speed position [H]. The forward first speed position [UL] is an operation position of a lower speed than the forward second speed position [L]. Switching operations of the stepped speed changing operation tool 66 to the neutral position [N], the forward third speed position [H], the forward second speed position [L] and the forward first speed position [UL] are effected in this mentioned order. Namely, the stepped speed changing operation tool 66 is switched from the neutral position [N] to the forward third speed position [H], switched from the forward third speed position [H] to the forward second speed position [L] and switched from the forward second speed position [L] to the forward first speed position [UL].

When the stepped speed changing operation tool 66 is operated to the neutral position [N], the speed changing operation shaft 61 is rotated by the operation force of the stepped speed changing operation tool 66 and in response to the operation force of the speed changing operation shaft 61, the shift drum 58 is rotated to a rotation operation position for realizing the neutral state. Then, the first shifter 55 is slid by the first shifter operating cam portion 59, whereby the first shift gear 36 is operated by the first shifter 55 to a state disengaged from the first speed gear 31 and from the third speed gear 33. Further, the second shifter 56 is slid by the second shifter operating cam portion 60, whereby the second shift gear 37 is operated by the second shifter 56 to a state disengaged from the second speed gear 32 and the reverse traveling gear 35. As the positioning rotation portion 71 is rotated in unison with the shift drum 58, the positioning arm 72 is engaged in a first receded portion 74a of the receded portions 74 provided at the five positions and the shift drum 58 is position-fixed by the detent mechanism 70 at the rotation operation position providing the neutral state (the rotation operation position where the first shift gear 36 and the second shift gear 37 are disengaged). In the gear transmission 20, the neutral state is provided, whereby transmission of power of the first shaft 23 to the second shaft 24 is stopped and the output to the front wheels 1 and the rear wheels 2 is stopped. The gear transmission 20 is maintained under the neural state by the detent mechanism 70. The rotation operation shaft 76b of the rotation potentiometer 76 is rotatably operated by the speed changing operation shaft 61 and the operation position of the speed changing operation shaft 61 is detected by the rotation potentiometer 76, and the detection result is outputted as detection result of the neutral state of the gear transmission 20 from the rotation potentiometer 76 to a display device (not shown) or the like.

When the stepped speed changing operation tool 66 is operated to the reverse position [R], by the operation force of the speed changing operation shaft 61, the shift drum 58 is operated to the rotation operation position realizing reverse traveling. Then, the first shifter 55 is slid by the first shifter operating cam portion 59 and the first shift gear 36 is operated by the first shifter 55 to a state disengaged from the first speed gear 31 and the third speed gear 33. Further, the second shifter 56 is slid by the second shifter operating cam portion 60, and the second shift gear 37 is operated by the second shifter 56 into a state engaged with the reverse traveling gear 35. The positioning rotation portion 71 is rotated in unison with the shift drum 58 and the positioning arm 72 is engaged with a second receded portion 74b of the receded portions 74 provided at the five positions and the shift drum 58 is maintained by the detect mechanism 70 at the rotation operation position realizing reverse traveling (the rotation operation position at which the second shift gear 37 is engaged with the reverse traveling gear 35 and the first shift gear 36 is disengaged from the first speed gear 31 and the third speed gear 33). In the gear transmission 20, reverse traveling state is provided, whereby the power of the first shaft 23 is speed-changed into reverse traveling power by a fourth input gear 29, a reverse-rotation gear 34 and a reverse traveling gear 35 and reverse traveling power is transmitted to the second shaft 24 and inputted from this second shaft 24 to the transmission mechanism 20B and reverse traveling power is outputted from the front wheel output shaft 51 to the front wheels 1 and reverse traveling power is outputted from the reverse differential mechanism 53 to the rear wheels 2. The gear transmission 20 is maintained under the reverse traveling transmission state by the detent mechanism 70. The rotation operation shaft 76b of the rotation potentiometer 76 is rotated by the speed changing operation shaft 61 and the operation position of the speed changing operation shaft 61 is detected by the rotation potentiometer 76 and the result of this detection is outputted from the rotation potentiometer 60 as detection result of the reverse traveling transmission state of the gear transmission 20.

When the stepped speed changing operation tool 66 is operated to the forward third speed position [H], by the operation force of the stepped speed changing operation tool 66, the speed changing operation shaft 61 is rotated and by the operation force of this speed changing operation shaft 61, the shift drum 58 is rotatably operated to the rotation operation position realizing forward third speed. Then, the first shifter 55 is slid by the first shifter operating cam portion 59 and the shift gear 36 is operated by the first shifter 55 into a state engaged with the third speed gear 33. Further, the second shifter 56 is slid by the second shifter operating cam portion 60 and the second shift gear 37 is operated by the second shifter 56 into a state disengaged from the second speed gear 32 and the reverse traveling gear 35. The positioning rotation portion 71 is rotated in unison with the shift drum 58 and the positioning arm 72 is engaged in a third receded portion 74c of the receded portions 74 provided at the five positions, and the shift drum 58 is fixed in position by the detent mechanism 70 at the rotation operation position realizing the forward third speed (the rotation position at which the first shift gear 36 is engaged with the third speed gear 33 and the second shift gear 37 is disengaged from the second speed gear 32 and from the reverse traveling gear 35). In the gear transmission 20, there is provided a forward traveling transmission state of the forward traveling third speed, whereby the power of the first shaft 23 is speed-changed to the forward traveling third speed power by the third input gear 28 and the third speed gear 33 and the forward traveling third speed power is transmitted to the second shaft 24 and inputted from this second shaft 24 to the transmission mechanism 20B and forward traveling third speed power of higher speed than the forward traveling first speed and the forward traveling second speed is outputted from the front wheel output shaft 51 to the front wheels 1, and the forward traveling power of the forward traveling third speed is outputted from the rear wheel differential mechanism 53 to the rear wheels 2. The gear transmission 20 is maintained under the forward traveling state of the forward third speed by the detent mechanism 70. The rotation operation shaft 76b of the rotation potentiometer 76 is rotatably operated by the speed changing operation shaft 61 and the operation position of the speed changing operation shaft 61 is detected by the rotation potentiometer 76 and the result of this detection as detection result of the forward traveling transmission state of the forward traveling third speed of the gear transmission 20 is outputted from the rotation potentiometer 76.

When the stepped speed changing operation tool 66 is operated to the forward traveling second speed [L], by the operation force of the stepped speed changing operation tool 66, the speed changing operation shaft 61 is rotatably operated and by the operation force of the speed changing operation shaft 61, the shift drum 58 is operated to the rotation operation position realizing forward traveling second speed. Then, the first shifter 55 is slid by the first shifter operating cam portion 59 and the first shift gear 36 is operated by the first shifter 55 into a state disengaged from the first speed gear 31 and from the third speed gear 33.

Further, the second shifter 56 is slid by the second shifter operating cam portion 60 and the second shift gear 37 is operated by the second shifter 56 into a state engaged with the second speed gear 32. The positioning rotation portion 71 is rotated in unison with the shift drum 58 and the positioning arm 72 is engaged in a fourth receded portion 74d of the receded portions 74 provided at the five positions, and the shift drum 58 is fixed in position by the detent mechanism 70 at the rotation operation position realizing the forward second speed (the rotation position at which the first shift gear 36 is disengaged from the first speed gear 31 and from the third speed gear 33 and the second shift gear 37 is engaged with the second speed gear 32). In the gear transmission 20, there is provided a forward traveling transmission state of the forward traveling second speed, whereby the power of the first shaft 23 is speed-changed to the forward traveling second speed power by the second input gear 27 and the second speed gear 32 and the forward traveling second speed power is transmitted to the second shaft 24 and inputted from this second shaft 24 to the transmission mechanism 20B and forward traveling second speed power of lower speed than the forward traveling third speed and also higher speed than the forward traveling first speed is outputted from the front wheel output shaft 51 to the front wheels 1, and the forward traveling power of the forward traveling second speed is outputted from the rear wheel differential mechanism 53 to the rear wheels 2. The gear transmission 20 is maintained under the forward traveling state of the forward second speed by the detent mechanism 70. The rotation operation shaft 76b of the rotation potentiometer 76 is rotatably operated by the speed changing operation shaft 61 and the operation position of the speed changing operation shaft 61 is detected by the rotation potentiometer 76 and the result of this detection as detection result of the forward traveling transmission state of the forward traveling second speed of the gear transmission 20 is outputted from the rotation potentiometer 76.

When the stepped speed changing operation tool 66 is operated to the forward traveling first speed [UL], by the operation force of the stepped speed changing operation tool 66, the speed changing operation shaft 61 is rotatably operated and by the operation force of the speed changing operation shaft 61, the shift drum 58 is operated to the rotation operation position realizing forward traveling first speed. Then, the first shifter 55 is slid by the first shifter operating cam portion 59 and the first shift gear 36 is operated by the first shifter 55 into a state engaged with the first speed gear 31. Further, the second shifter 56 is slid by the second shifter operating cam portion 60 and the second shift gear 37 is operated by the second shifter 56 into a state disengaged from the second speed gear 32 and from the reverse traveling gear 35. The positioning rotation portion 71 is rotated in unison with the shift drum 58 and the positioning arm 72 is engaged in a fifth receded portion 74e of the receded portions 74 provided at the five positions, and the shift drum 58 is fixed in position by the detent mechanism 70 at the rotation operation position realizing the forward first speed (the rotation position at which the first shift gear 36 is engaged with the first speed gear 31 and the second shift gear 37 is disengaged from the second speed gear 32 and from the reverse traveling gear 35). In the gear transmission 20, there is provided a forward traveling transmission state of the forward traveling first speed, whereby the power of the first shaft 23 is speed-changed to the forward traveling first speed power by the first input gear 26 and the first speed gear 31 and the forward traveling first speed power is transmitted to the second shaft 24 and inputted from this second shaft 24 to the transmission mechanism 20B and forward traveling first speed power of lower speed than the forward traveling third speed and the forward traveling second speed is outputted from the front wheel output shaft 51 to the front wheels 1, and the forward traveling power of the forward traveling first speed is outputted from the rear wheel differential mechanism 53 to the rear wheels 2. The gear transmission 20 is maintained under the forward traveling state of the forward first speed by the detent mechanism 70. The rotation operation shaft 76b of the rotation potentiometer 76 is rotatably operated by the speed changing operation shaft 61 and the operation position of the speed changing operation shaft 61 is detected by the rotation potentiometer 76 and the result of this detection as detection result of the forward traveling transmission state of the forward traveling first speed of the gear transmission 20 is outputted from the rotation potentiometer 76.

[Transmission Flexibility Portion]

As shown in FIG. 6, the transmission mechanism 20B includes a transmission flexibility portion 80 configured to allow free rotation of the second shaft 24 as the "rotation support shaft" by a set rotation angle. More particularly, this transmission flexibility portion 80, as shown in FIG. 6, is provided at a portion of the fifth shaft 49 as the "rotation transmission shaft" at which portion the gear coupling mechanism 40 is coupled. This portion of the fifth shaft 49 at which portion the gear coupling mechanism 40 is coupled is a portion of the fifth shaft 49 on more transmission-wise upstream than the portions of the fifth shaft 49 at which portions the front wheel output shaft 51 and the rear wheel differential mechanism 53 are coupled. The transmission flexibility portion 80, as shown in FIG. 6, includes a transmitting rotation portion 81 provided in the fourth transmission gear 45 and rotatable with this fourth transmission gear 45 and a transmitted rotation portion 82 provided on the fifth shaft 49 and rotatable together with the fifth shaft 49. At a plurality of positions in the lateral portion of the transmitting rotation portion 81, transmitting protrusions 83 are provided, whereas, at a plurality of positions in the lateral portion of the transmitted rotation portion 82, transmitted protrusions 84 are provided. The transmitting protrusions 83 and the transmitted protrusions 84 are provided in such a manner that one transmitted protrusion 84 is engaged between mutually adjacent transmitting protrusions 83 and also the transmitting protrusions 83 and the transmitted protrusions 84 are position-displaceable by a set displacement angle A relative to each other.

With the transmission flexibility portion 80 in operation, as the transmitting protrusion 83 and the transmitted protrusion 84 come into abutment each other via respective end faces thereof, transmission of forward traveling power from the fourth transmission gear 45 to the fifth transmission shaft 49 is effected. When the transmitting protrusion 83 and the transmitted protrusion 84 come into abutment each other via respective other end faces thereof, transmission of reverse traveling power from the fourth transmission gear 45 to the fifth shaft 49 is effected. And, by the relative positional displacement by the set displacement angle A between the transmitting protrusion 83 and the transmitted protrusion 84, free rotation of the second shaft 24 by the set rotation angle A is allowed.

When the first shift gear 36 is to be engaged with the first speed gear 31, even if respective end faces of the first shift gear 36 and the teeth portion 31a of the first speed gear 31 hit each other, as free rotation of the second shaft 24 is allowed by the transmission flexibility portion 80, the first shift gear 36 and the first speed gear 31 can easily be displaced relative to each other in the rotational direction, so that the first shift gear 36 can come into engagement with the teeth portion 31a of the first speed gear 31 easily. This is also true with the case of the first shift gear 36 being engaged with the third speed gear 33, the case of the second shift gear 37 being engaged with the second speed gear 32 and the case of the second shift gear 37 being engaged with the reverse traveling gear 35.

In this embodiment, the transmitting protrusions 83 and the transmitted protrusions 84 are provided. However, the transmission flexibility portion may be alternatively configured such that a receded portion is provided in one of the transmitting rotation portion 81 and the transmitted rotation portion 82 and a transmitting protrusion which can slidably engage into the receded portion to be slidable by a set rotation angle is provided in the other of the transmitting rotation portion 81 and the transmitted rotation portion 82.

OTHER EMBODIMENTS (1) In the foregoing embodiment, there was disclosed an example in which the stepless speed changing device 10 is constituted of a belt type stepless speed changing device. The invention is not limited thereto, but the stepless speed changing device 10 may be constituted of various kinds of stepless speed changing device such as a hydrostatic stepless speed changing device (2) In the foregoing embodiment, there was disclosed an example in which the stepless speed changing device 10 and the gear transmission 20 are provided in series in such a manner that power from the engine 8 is inputted to the stepless speed changing device 10 and output of the stepless speed changing device 10 is inputted to the gear transmission 20. Alternatively, the stepless speed changing device 10 and the gear transmission 20 may be provided in series in such a manner that power from the engine 8 is inputted to the gear transmission 20 and output of the gear transmission 20 is inputted to the stepless speed changing device 10.

(3) In the foregoing embodiment, there was disclosed an example in which the gear transmission 20 is configured to be capable of speed changing in reverse traveling one speed. Alternatively, it may be configured to be capable of speed changing in two or more reverse traveling speeds.

In the foregoing embodiment, there was disclosed an example in which the accelerator pedal 16 is provided as a stepless speed changing operational tool. However, there may be provided a speed changing lever for speed-changing the stepless speed changing device 10 only.

(4) In the foregoing embodiment, the front wheels 1 and the rear wheels 2 are provided. Instead, crawler type traveling devices may be provided.

Industrial Applicability

The present invention is applicable to a multiple-purpose vehicle including a stepless speed changing device and a gear transmission provided in series in a traveling power transmission system for transmitting power from an engine to a traveling device and configured to speed-change the power from the engine and transmit the resultant power to the traveling device, a stepless speed changing operational tool for speed-changing operation of the stepless speed changing device, and a stepped speed changing operational tool for speed changing the gear transmission. The gear transmission is applicable to a multiple-purpose vehicle having a plurality of shift gears and a shift drum.

DESCRIPTION OF SIGNS

1: traveling device (front wheel)
2: traveling device (rear wheel)
8: engine
10: stepless speed changing device
16: stepless speed changing operational tool (accelerator pedal)
20: gear transmission
24: rotation support shaft (second shaft)
31: speed (changing) gear (first speed (changing) gear)
32: speed (changing) gear (second speed (changing) gear)
33: speed (changing) gear (third speed (changing) gear)
36: shift gear (first shift gear)
37: shift gear (second shift gear)
55: shifter (first shifter)
56: shifter (second shifter)
58: shift drum
59: shifter operational cam portion (first shifter operational cam portion)
60: shifter operational cam portion (second shifter operational cam portion)
66: stepped speed changing operational tool
H: forward third speed position
L: forward second speed position
UL: forward first speed position

The invention claimed is:
1. A multiple-purpose vehicle including:
a gear transmission provided in series in a traveling transmission system for transmitting power from an engine to a traveling device having a front wheel and a rear wheel and configured to change power from the engine and transmit resultant power to the traveling device; and
a speed changing operational tool for speed-changing operation of the gear transmission,
wherein the gear transmission comprises:
a transmission case;
a first shaft configured to receive power from the engine;
a speed changing operation shaft rotatable operably by an operation force of the speed changing operational tool;
a rotation transmission shaft configured to receive power from the first shaft the power being changed as the speed changing operation shaft is operably rotated;
a front wheel output shaft configured to transmit power from the rotation transmission shaft to the front wheel; and a rear wheel driving shaft configured to transmit power from the rotation transmission shaft to the rear wheel;

wherein with a direction of a forward traveling of a vehicle body being taken as a front:

the first shaft is disposed in an upper front portion of the transmission case, the speed changing operation shaft is disposed in an upper portion of the transmission case, the rotation transmission shaft is disposed in a lower portion of the transmission case, the front wheel output shaft is disposed in a lower front portion of the transmission case, the rear wheel driving shaft is disposed in a rear portion of the transmission case, the front wheel output shaft projects forward from the transmission case, and the first shaft, the speed changing operation shaft, the rotation transmission shaft and the rear wheel driving shaft extend in a lateral width direction of the vehicle body.

2. The multiple-purpose vehicle according to claim 1, wherein:

the speed changing operation shaft is disposed rearward of the first shaft, the front wheel output shaft is disposed forward of the rotation transmission shaft, and the rear wheel driving shaft is disposed below the first shaft and the speed changing operation shaft.

3. The multiple-purpose vehicle according to claim 1, wherein the speed changing operation shaft is disposed between the rotation transmission shaft and the rear wheel driving shaft as viewed from above.

4. The multiple-purpose vehicle according to claim 1, wherein the rear wheel driving shaft is disposed rearward of the speed changing operation shaft and the rotation transmission shaft.

5. The multiple-purpose vehicle according to claim 1, wherein the first shaft has a first input gear, a second input gear, a third input gear and a fourth input gear, and the gear transmission further comprises:

a second shaft extending in the lateral width direction of the vehicle body and disposed rearward of the first shaft;

a plurality of speed gears disposed on the second shaft;

a third shaft extending in the lateral width direction of the vehicle body forward of the first shaft; and a reverse-rotation gear disposed on the third shaft and configured to mesh with the fourth input gear, and wherein, in response to the reverse-rotation gear meshed with the fourth input gear, the first input gear, the second input gear, or the third input gear being meshed with the corresponding speed gear, power from the engine is changed, respectively, as a rear first speed, a forward first speed, a forward second speed, or a forward third speed, and transmitted from the first shaft via the second shaft to the rotation transmission shaft.

6. The multiple-purpose vehicle according to claim 5, wherein the speed gears include:

a reverse traveling gear;

a third speed gear configured to set the forward third speed;

a second speed gear having an outside diameter greater than an outside diameter of the third speed gear, and configured to set the forward second speed; and a first speed gear having an outside diameter greater than an outside diameter of the second speed gear and configured to set the forward first speed, wherein the first speed gear is supported to the second shaft between the second speed gear and the third speed gear.

7. The multiple-purpose vehicle according to claim 6, wherein in the lateral width direction of the gear transmission, the first speed gear is disposed inner of the second speed gear, and the first speed gear is disposed inner of the third speed gear.

* * * * *